Sept. 15, 1970

C. B. DANIELS 3,528,117

TAPPING MACHINE

Filed Sept. 11, 1967

INVENTOR.
CLARENCE B. DANIELS
BY

Charles L. Lovercheck
attorney

Sept. 15, 1970     C. B. DANIELS     3,528,117

TAPPING MACHINE

Filed Sept. 11, 1967     3 Sheets-Sheet 2

INVENTOR.
CLARENCE B. DANIELS
BY
Charles L. Lovercheck
attorney

Sept. 15, 1970  C. B. DANIELS  3,528,117
TAPPING MACHINE

Filed Sept. 11, 1967  3 Sheets-Sheet 3

INVENTOR.
CLARENCE B. DANIELS
BY

Charles L. Lovercheck
atty

United States Patent Office 3,528,117
Patented Sept. 15, 1970

3,528,117
TAPPING MACHINE
Clarence B. Daniels, Brandt School Road,
Wexford, Pa. 15090
Filed Sept. 11, 1967, Ser. No. 666,778
Int. Cl. B23g 1/02, 1/04
U.S. Cl. 10—129
12 Claims

ABSTRACT OF THE DISCLOSURE

The invention disclosed herein involves a machine for threading collars or pipe couplings with internal tapered threads. A chuck for holding the collars is supported and rotated on the machine. The collars are fed to the chuck, and the bar having threading teeth on it. The bar is fed through the collar at a predetermined rate and at an angle corresponding to the desired taper on the threads to be cut. It cuts the threads as it passes through. The bar may have one or more teeth. The teeth may be spaced apart by multiples of thread pitch. The chuck can be rotated at any desired speed and can take any reasonable depth of cut. The arbor carries cuttings away from the coupling. The teeth can be spaced apart as far as desired. The units can be changed in a very short time. The chucks rotate continuously on the automatic version of this machine.

---

This invention relates to threading machines and, more particularly, to machines for cutting tapered threads on the inside surface of collars or the like.

Among the various advantages of the present invention are: Any reasonable size cut can be taken; the arbor carries cuttings and chips away from the coupling; the cutting teeth on the arbor could be as far apart as desired, making it easier for grinding and to carry away heat; the cutting teeth may be made of a different material than the bar itself, for example, they can be made of tungsten carbide with room to grind the teeth; the rotation of the chucks is continuous on the automated version of the machine, and the bars pass around the machine in continuous sequence.

It is, accordingly, an object of the invention to provide an improved threading machine.

Another object of the invention is to provide an improved machine for cutting threads on the inside of collars and the like.

Another object of the invention is to provide an improved threading machine which can run through a coupling that has already been threaded with rough threads and it smooths the threads.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 8 is an enlarged side view of the bar;

FIG. 9 is an enlarged end view of the bar; and

FIG. 10 is an enlarged rear view of the bar.

Figure 1:
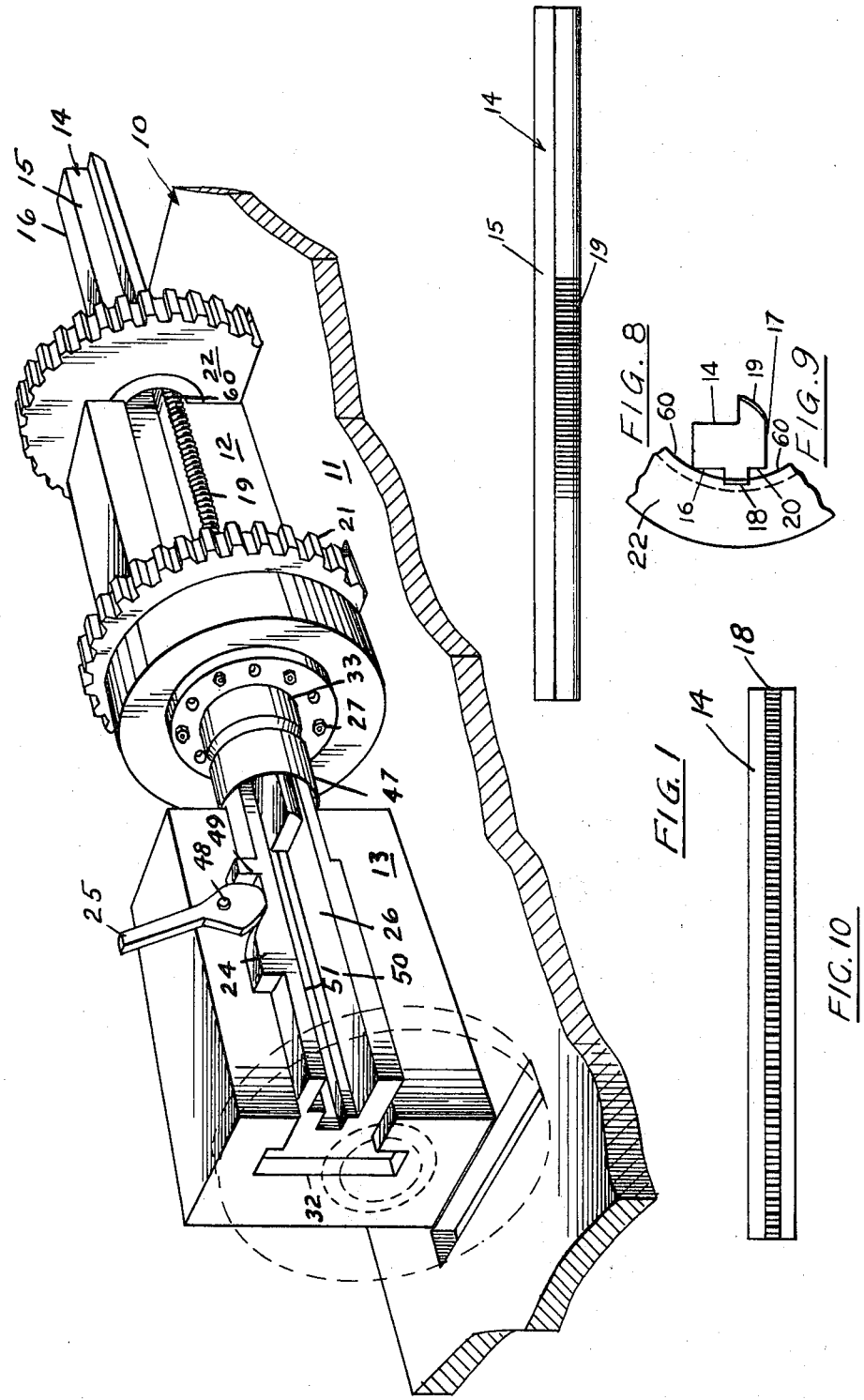
FIG. 1 is an isometric schematic view of the machine according to the invention.

Now with more particular reference to the drawings, the machine is shown generally at 10 having a base 11 and spaced support members 12 and 13 that may be generally in the configuration of pillow blocks, and they each have guide surfaces on them that guide the bar 14.

The bar 14 has a first side surface 15, second side surface 16, third side surface 17, and fourth side surface 18, which mate with complimentary guide surfaces in the support member 12 and in the sliding part 26 of the actuating member for the chuck. The sliding member 26 is generally T-shaped and fits into a complimentary shaped slot 32 in support member 13 as indicated.

The bar has threads 18 on it, which mate with internal threads 60 on gear 22. The bar likewise has cutting teeth 19 on the opposite side, which cut the inside threads on the article 33. The article 33 may be a collar that is to have a tapered pipe thread cut on the inside of it.

The first gear 21 is fixed to the outside of the chuck 23, and it rotates the chuck. Suitable bearings will be provided by those skilled in the art. It will be noted that the end surface 34 of the first support member 12 is disposed inside the counterbore 35 of the chuck. This prevents any overhang of the bar 14 between it and the collar or article 33 and results in a more rigid arrangement and more accurate cutting of the threads.

Figure 2:
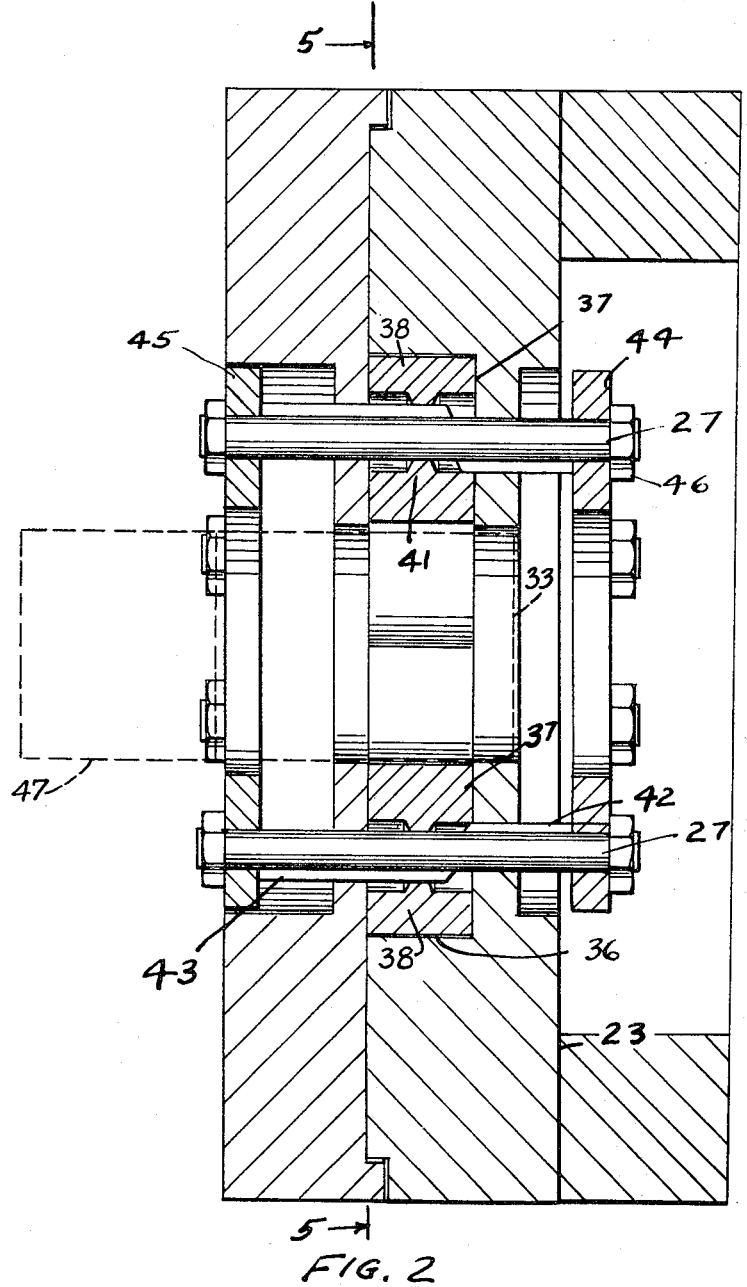
FIG. 2 is a longitudinal cross sectional view of the chuck used in the machine.

The chuck 23 is best shown in FIG. 2. It has an inner bored cylindrical surface 36 that engages the outer periphery of the pawl members 37. The pawl members have a flattened surface 38 on one side suitably contoured to give a smooth action. The remainder of the outside of the pawls is cylindrical in the example shown. This flattened surface engages the inner surface 36 of the chuck and acts to urge the pawls into gripping engagement with the couplings.

Figure 7:
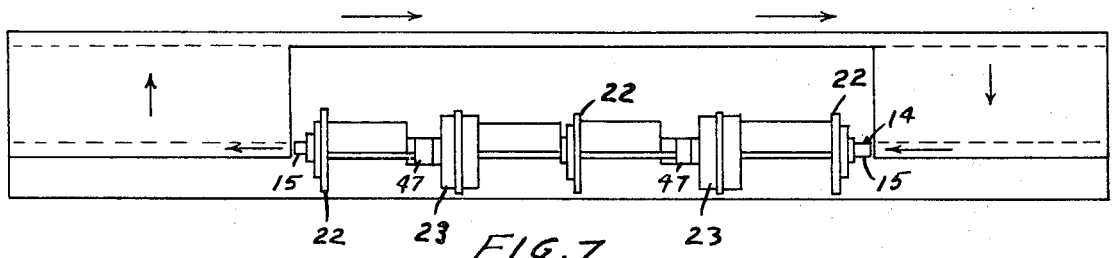
FIG. 7 is a view of a plurality of the machines connected in tandem with recirculating bars indicated by arrows schematically.

The pawls have a counterbore from each side indicated at 39 and 40, and the intermediate flange part 41 of the pawls engages the cammed surfaces 42 and 43 on the axles 27. It will be noted that the ends of axles 27 are received in holes in rings 44 and 45 and are held in place on the rings 44 and 45. It will be noted that the collar 47 engages and moves the slidable member 26 toward the chuck and forces a collar 33 into the chuck when the lever 25 is moved in one direction. Collar 47 is an integral part of slide 26. The lever 25 is attached to the supporting member by means of a pivot 48 which engages a follower surface 49 and urges the slidable member 24 and actuating collar 47 toward and away from the collar 47. The surfaces 50 and 51 on the slidable member act on the outer surfaces of the bar and guide it to the next support member corresponding to support member 12, as shown in FIG. 7.

It will be noted that the rings 44 and 45 are in the position shown in FIG. 2, the cam surfaces 43 engage the intermediate part 41 of the pawls and urge them outward so that the pawls move away from the collar 33. When a coupling is fed to the check and lever, the friction of the pawls on the collar 33 rotates the collar 33 and the flattened surface 38 moves the pawl means inward and it engages the inside surface 38 of the body. When the rings 44 and 45 are pushed in the opposite position by detents 61 on hooks 62, the cammed surfaces 42 urge the pawls inward and allow them to move away from surface 38 and thereby release the collar 37 so that it can be removed from the chuck. Notch 61 in pawls 37 engages cams 43 and aid in aligning the cam then is pushed to locked position.

The gears 21 and 22 are driven by the line shaft 53, which has sprockets 54 on it, which engage the gears 22. The motor M drives the line shaft 53. Since the line shaft drives all of the gears, the threading members are all in synchronism with each other.

When parts are fed down the feeding mechanism 55 and the handle 25 is moved to move the actuating collar 47 to the left, an article to be threaded 33 will be dropped into the space between the actuating collar 47 and the chuck. Then when the handle 25 is moved, the slide 24 will cause the actuating collar 47 to force the collar to be threaded into the chuck. Further movement of the handle 25 will cause the actuating collar 47 to engage the ring 45 and force the cage assembly of the chuck to a position shown in FIG. 2.

The sequence of events in loading, threading and discharging couplings in the machine disclosed are as follows:

Referring to FIG. 1, while gears 21 and 22 are rotating, lever 25 is moved to move sliding member 26 to the left. A force is applied to ring 44 to move it to the left to unlock pawls 37 by moving cam surface 43 away from lug 51 and forcing cam surface 42 against the inner periphery of lug 61. Since the chuck is rotating, pawls 37 will rotate on axles 27 and bring the flattened surface 38 around adjacent the coupling, thereby allowing the flattened surface of the pawls to move adjacent the coupling and free it. The coupling will then be released and it can be discharged from the chuck by pushing it to the right.

Another coupling is then fed into the chuck from the left by means of a feeding mechanism 55 or some other suitable means.

Sliding member 26 is moved to the right thereby forcing rings 45 and 46 to the position shown in FIG. 1. As pawls 37 ride up on cam 43, they will be stopped in their rotation on axles with flattened surface 38 adjacent the inner periphery of the chuck and the roughened surfaces against the coupling.

Figures 3, 4:
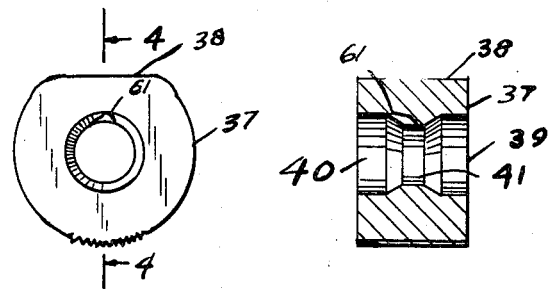
FIG. 3 is an end view of one of the pawls used in the chuck.
FIG. 4 is a longitudinal cross sectional view taken on line 4—4 of FIG. 3.
Figure 5:
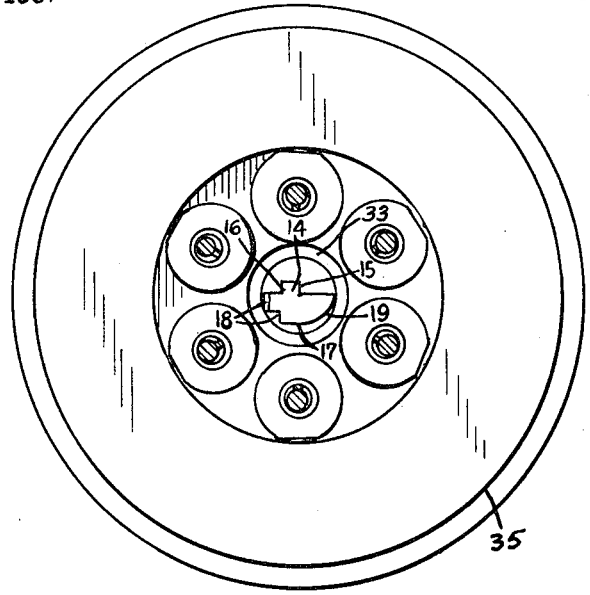
FIG. 5 is an end view of the chuck.
Figure 6:
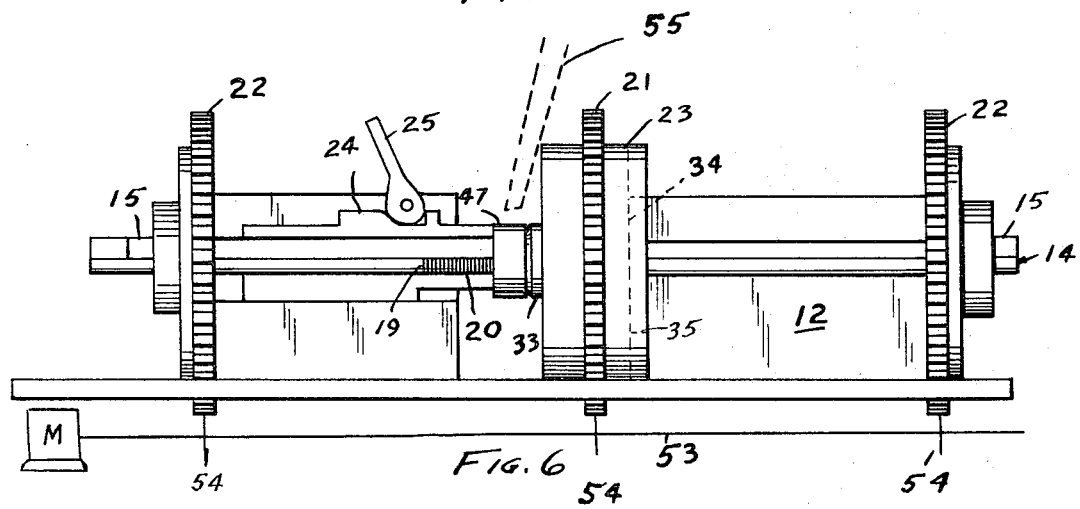
FIG. 6 is a side schematic view of the machine.

A bar 14 will then be fed through the coupling. As teeth 19 engage the inner periphery of the coupling, a torsional force will be exerted on the coupling tending to rotate the coupling in the chuck. The tendency of the coupling to rotate with the chuck will cause a corner of the pawls at one side of flattened surface 38 to rock and thereby exert a force which will bring the toothed surface of the pawls toward the coupling (see FIG. 3) to engage the coupling gripping it and holding it firmly against rotation.

When the bar 14 has passed through the coupling, ring 44 may again be forced to the left releasing the pawls from the coupling and allowing the coupling to be removed and the procedure repeated.

A feeding mechanism 55 which may be any suitable feeder such as a hopper type feeder or a vibratory feeder, is provided to feed the collars to the chucks. A suitable escapement and feeding device connecting these feeders to the machines will be obvious to those skilled in the art from an examination of the various feeding mechanisms that are available.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for threading articles of manufacture comprising
a frame,
spaced support members on said frame defining a space therebetween,
a chuck member disposed in said space,
means to rotate said chuck member,
said chuck having an opening therethrough,
means on said chuck to clamp an article to be threaded,
track means on said support members,
said track means being aligned with said axial opening through said chuck,
said track means being disposed on both sides of said chuck,
an elongated bar,
said bar having at least one cutting tooth thereon,
said bar being adapted to be moved on said track through said opening in said chuck from one side to the other whereby said tooth engages said article and cuts a thread on said article as said entire bar passes through said chuck.

2. The machine recited in claim 1 wherein said machine has means to move said bar along said track.

3. The machine recited in claim 1 wherein one side of said chuck is disposed in close proximity to said first support member, whereby bending of said bar between said first support and said chuck is reduced.

4. The machine recited in claim 1 wherein actuating means for said chuck is disposed on said second support, whereby means is provided on said chuck whereby said chuck may be actuated to grip a said article to clamp it for rotation with said chuck, and
said chuck may be released to unclamp said article.

5. The machine recited in claim 1 wherein
said bar has a plurality of teeth,
said teeth being spaced at multiples of the spacing of threads to be cut on said article.

6. The machine recited in claim 5 wherein
said means to move said bars comprising threads on said bars and a driven threaded member engaging said threaded member.

7. The machine recited in claim 6 wherein
a plurality of said spaced supports are provided, and
a plurality of said chucks are provided, and
a said feeding means is provided at each said chuck to feed said articles to said chuck.

8. The machine recited in claim 6 wherein
said means to rotate said chuck comprises a first gear on said chuck,
said means to move said bar along said track comprises a second gear,
said first gear and said second gear being rotatable about axes spaced from each other,
a shaft having drive means thereon engaging said first gear and said second gear rotating them in synchronism with each other.

9. The machine recited in claim 7 wherein
each said chuck and each said feeding means has a first and a second gear, and
said drive means on said shaft engages said gears rotating them in synchronism with each other.

10. The machine recited in claim 6 wherein said bar has a first side, a second side, a third side, and a fourth side,
said third side and said fourth side being defined by surfaces generally parallel to each other and on opposite sides of said bar from each other,
said first side and said second side being defined by generally flat surfaces on opposite side of said bar from each other and generally parallel to each other and perpendicular to said third and fourth sides,
said cutting teeth being disposed on said bar opposite said third side.

11. The machine recited in claim 1 wherein
said chuck comprises a generally cylindrical body member having a central opening therethrough,
spaced generally cylindrical pawl members in said cylindrical member,
said cylindrical body member having an inner cylindrical surface,
said pawl members having a flattened portion on their outer periphery engaging said cylindrical surface,
each said bore having a central bore counterbored from each side, a plurality of axles, one said axle extending through each said bore, a cam member on each said axle, and said actuating means comprises means for reciprocating said axles whereby said cam member forces said pawls toward the center of said body and away from the center of said body whereby said articles are clamped and unclamped.

12. The machine recited in claim 11 wherein said actuating means comprises a slidable member slidably supported on said second support member.

References Cited

UNITED STATES PATENTS

| 119,916 | 10/1871 | Carpenter | 10—101 |
| 230,629 | 8/1880 | Grant | 10—101 |
| 415,845 | 11/1889 | Richards | 10—129 |
| 1,125,170 | 1/1915 | Price | 10—101 |

CHARLES W. LANHAM, Primary Examiner

E. M. COMBS, Assistant Examiner